3,320,104
METHOD OF MAKING LEAD STYPHNATE PRIMER COMPOSITIONS

Hans Stadler, Nurnberg, and Heinz Gawlick, Furth, Bavaria, Germany, assignors to Dynamit Nobel Aktiengesellschaft, Troisdorf, Germany
No Drawing. Filed Feb. 26, 1965, Ser. No. 435,692
Claims priority, application Germany, Feb. 28, 1964, D 43,750
5 Claims. (Cl. 149—24)

The present invention relates to a method for manufacturing primer compositions, and more particularly, to a method of manufacturing conductive primer compositions adapted to be donated or ignited by means of an electric current pulse.

In order to be able to ignite a primer composition directly by an electric current pulse, it is necessary to add to the primer composition a conductive material. Metallic powders, such as the powders of noble metals and light metals, conductive oxides, for example, lead oxide, and also graphite or carbon black may be used for this purpose. However, these are materials which do not participate in the chemical reaction of the primer, that is, are inert with respect thereto and thus constitute a ballast. This, however, has as a consequence that the conductive material addition has an influence on the ignitability of the primer composition and impairs the same the greater the proportion of conductive material that has to be chosen.

A diminution of the conductive material quantity leads to the necessity of utilizing the conductive material in the finest distribution in order to achieve the purpose of having all the non-conductive particles coated with a conductive layer. In attempting to do this, a difficulty arises. To a large degree, the non-conductive materials of the primer composition consist of highly sensitive primer compositions. Hence, only careful and gentle mixture operations that preclude the occurrence of mechanical stresses can be considered. However, in that case it is very difficult to achieve the requisite fine distribution of the conductive material in the primer material.

The present invention starts with the task of so carrying out the mixing operation that even with the application of the aforementioned careful and gentle mixing operation a good and uniform distribution of the conductive material is achieved. The solution of this aim consists, in accordance with the present invention, in that the conductive additive is initially applied by a mixing operation to a carrier material insensitive to mechanical stresses and is then transferred from the same to the primer composition in a subsequent gentle mixing operation. It has been discovered in a surprising manner that with a relatively small quantity of ballast material a very excellent uniform distribution of the conducting material in the primer composition is attainable.

The carrier material may be inert with respect to the primer composition, for example, it may be barium sulfate or aluminum oxide. However, a material which participates in the reaction of the primer composition may also be used as carrier, such as for example, barium nitrate.

Some examples of the process in accordance with the present invention will be described hereinafter, it being understood that the present invention is not limited thereto but is susceptible of numerous changes and modifications as known to persons skilled in the art. In ensuing examples, the percentages are related to the final mixture consisting of primer composition, conducting additive and conductive material carrier.

Example I

| | Percent |
|---|---|
| Graphite as conductive material | 3 |
| Barium nitrate as carrier material | 7 | are intensively tumbled and intermixed and are then added in a conventional gentle and protective mixing operation to 90% of lead styphnate as primer composition.

Example II

| | Percent |
|---|---|
| Graphite as conductive material | 2 |
| Barium sulfate as carrier material | 6 | are initially intermixed and are then added as before to 92% of lead styphnate.

Example III

| | Percent |
|---|---|
| Graphite as conductive material | 3 |
| Aluminum oxide as carrier material | 5 | are mixed with each other and are then added in a gentle and protective mixing operation to 92% lead styphnate.

In the Examples II and III, the carrier material, in relation to the primer composition, is inert, whereas barium nitrate in Example I as an oxygen carrier participates in the reaction of the primer composition.

If the carrier material is water soluble such as for example, barium nitrate according to Example I, then it is appropriate to wet the carrier material with 0.5 to 3% of water before it is mixed with the conductive material. Only a slight wetting of the surfaces of the particles of the water soluble material is to be achieved thereby. The adherence is thereby increased and the distribution improved. The mixture is dried prior to its addition to the primer composition so that no water is present in the end product.

Of course, the present invention is not limited to any particular primer composition but may be used with any known primer material sensitive to mechanical stresses to which one desires to add a conductive material when used as an electrically ignited primer. The conductive material may be constituted by any conventional known ingredient such as any of the ingredients mentioned hereinabove, and the carrier material may be also of any conventional type, for instance of the type indicated above. Among the numerous other carrier materials which may be used with the present invention are the following: Talcum, silicon dioxide, magnesium oxide, potassium carbonate.

Typical examples of known primers with which the present invention may be used are as follows: Primers for automatic guns (calibre 20 mm. to 40 mm.), or in priming screws for large-calibre ammunition.

Additionally, the percentages of the various ingredients may be varied at will to suit the needs of a particular situation. It is only important, in carrying out the present invention, to utilize as carrier for the conductive material, a material which is insensitive against the mechanical stresses that occur when mixing the conductive material with the primer composition in a conventional manner. The mixing of the thus pre-prepared mixture of conductive material-carrier material as well as the subsequent transfer of the conductive material to the primer material can be realized in any conventional known manner, in case of the latter by any known press which affords the requisite protection against mechanical stresses.

We claim:
1. A method for making a conductive primer composition adapted to be detonated or ignited by means of an electric current which comprises mixing a conductive additive selected from the group consisting of metallic powders, conductive metallic oxides and graphite with an inorganic carrier material insensitive to mechanical stresses and adding the resultant mixture by gentle mixing to a major amount of a lead styphnate primer material, said primer material being sensitive to mechanical stresses, to form said primer composition.

2. The method of claim 1, wherein the carrier material is wetted with about 0.5 to 3% by weight of water before it is added to the conductive additive and the carrier-conductive additive mixture is then dried prior to its addition to the primer material.

3. The method of claim 1, wherein the carrier material is selected from the group consisting of barium nitrate, aluminum oxide and barium sulfate.

4. A method for making a conductive primer composition adapted to be detonated or ignited by means of an electric current wihch comprises wetting an inorganic carrier material selected from the group consisting of barium nitrate, aluminum oxide and barium sulfate with about 0.5 to 3% by weight of water, adding said wetted carrier material to a conductive additive selected from the group consisting of graphite and lead oxide, drying said carrier-conductive additive mixture, and adding said mixture by gentle mixing to a major amount of a lead styphnate primer composition sensitive to mechanical stresses.

5. A method for making a conductive primer composition adapted to be detonated or ignited by means of an electric current which comprises mixing graphite with an inorganic carrier material insensitive to mechanical stresses and selected from the group. conssting of barium nitrate, aluminum oxide, and barium sulfate, and adding this mixture by gentle mixing to a major amount of lead styphnate to form said primer composition.

References Cited by the Examiner
UNITED STATES PATENTS

| | | | |
|---|---|---|---|
| 2,887,370 | 5/1959 | Donnard | 149—114 |
| 2,970,047 | 1/1961 | Ciccone | 149—41 |
| 3,090,310 | 5/1963 | Peet et al. | 149—41 |
| 3,238,076 | 3/1966 | Taylor et al. | 149—114 |

CARL D. QUARFORTH, *Primary Examiner.*

BENJAMIN R. PADGETT, *Examiner.*

S. J. LECHERT, Jr., *Assistant Examiner.*